Figure 1:
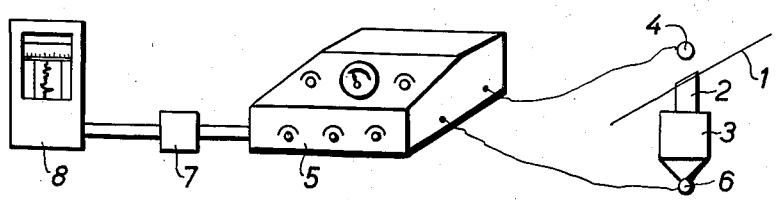

June 2, 1959　　　F. LINSERT ET AL　　　2,889,463
DEVICE FOR MEASURING THE TITRE OF A RUNNING THREAD
Filed Feb. 25, 1954

INVENTORS:
FRITZ LINSERT, ARTHUR PRIETZSCHK.
BY
Burgess + Dinklage
ATTORNEYS

United States Patent Office 2,889,463
Patented June 2, 1959

2,889,463
DEVICE FOR MEASURING THE TITRE OF A RUNNING THREAD

Friedrich Linsert, Dormagen, and Artur Prietzschk, Krefeld, Germany, assignors to Farbenfabriken Bayer Aktiengesellschaft, Leverkusen, Germany, a corporation of Germany Application February 25, 1954, Serial No. 412,576

Claims priority, application Germany February 28, 1953

4 Claims. (Cl. 250—83.3)

The present invention relates to a method of, and a device for, measuring the titre of a running thread by determination of the titre by measuring the mass absorption of a radiation at the thread consisting of a number of capillary threads.

Electrical, optical or mechanical methods for measuring the titre of a running rayon thread are always dependent on certain conditions when an optimum measuring accuracy is to be attained. Otherwise, considerable errors of measurement may occur, if, with the same titre, the shape of the thread or the mass distribution in the cross section vary, if different degrees of moisture occur, or if the thread surface is deteriorated by fluffs. These disadvantages are according to the present invention overcome by determining the titre by means of measuring the mass absorption of a radiation at the thread. Soft X-rays are most suitable for this purpose, because corpuscular rays are excluded for the following reasons:

The ionization of the air by $\alpha$-rays is not unequivocally dependent on the mass through which the rays are passed. In addition, it is strongly influenced by the humidity of the air. As the ionization curve (Bragg's curve) is ambiguous within a few centimetres, exact measurements are impracticable, because it always remains uncertain at what place of the curve the measuring process takes place.

While $\beta$-rays have an absorption approximately proportional to the mass through which the rays pass, the required accuracy of measurement can in no way be ensured. Owing to their characteristic inhomogeneity the drop of the ionization takes place as a function of the thickness in accordance with no simple and unambiguous known exponential law. In addition, this function is very much dependent on the geometrical arrangement of the measuring elements (emitter, substance to be measured, ionization chamber) which has a considerable influence on the scattering and rediffusion of the electrons. As estimation of this error along theoretical lines is impossible, all the more so as the mass of the capillary threads is still below the limit thickness of the rediffusion. Finally, $\beta$-rays are excluded for the present purpose, because a sufficient and intensive source of radiation (preparation) for a cross section of the rays of 0.1 x 10 mm.² is not available. This means that a high speed of measurement cannot be attained, and thus short variations of the titre of rapidly running threads cannot be recognized. This requirement is, however, fully met by X-rays.

Only this type of rays is in a position to concentrate radiation intensities on the small thread surfaces which are so high that high measuring speeds are achieved. Furthermore, the absorption of this homogeneous radiation takes place in accordance with an unambiguous known exponential law to which every problem, which may arise, is subject. Therefore, it is only the application of X-rays which permits, on a satisfactory theoretical basis, of selecting a measuring arrangement suppressing the shape of the thread and the mass distribution in the cross section to such an extent that an accuracy of measurement of at least ±1 can be warranted. In this measuring arrangement, the rays are passed through a conically enlarged slit, the width of which is adapted to the thread titre in accordance with theoretical investigations. The radiation which is weakened through the mass of the thread running in the slit, is measured by means of a counting tube. When the slit is suitably selected, the measuring result is, outside the limit of error, independent of the shape of the cross-section of the thread and of the mass distribution in the cross section of the thread (in our case, the error is smaller than 1%). The high measuring speed allows short titre variations of rapidly running threads to be recognized. The process permits of checking the titre during warping and also of instantly searching for the cause of a titre variation at the machine.

Further advantages of the method are its suitability for measuring thin threads, its accuracy of measurement (±1%), the indication of the humidity in correct proportions and the measurement of the titre during an uninterrupted spinning process. Thus, it is made possible to use the method in a checking device automatically recording the titres of a number of threads running parallel to each other.

While it is the application of X-rays only that gives unobjectionable measuring accuracies in the measuring of the mass absorption of a radiation at a thread of lower titre, since the laws for the absorption of X-rays allow a theoretical unambiguous arrangement of the measuring elements for attaining a definite accuracy, the measurement of the mass absorption of a radiation at threads with a high titre, especially bands of fibrous material, rovings and fabrics, can also be accomplished by means of $\beta$-rays since the larger cross-section of threads having a high titre permits a larger radiation surface so that the large impulse frequency in the ionization chamber guarantees a sufficient measuring accuracy.

Since, however, the application of $\beta$-rays involves an uncertainty as regards the geometrical arrangement of the measuring elements and their influence on the measuring accuracy, the threads having a high titre are passed according to the invention successively through a measuring arrangement for X-rays as well as a measuring arrangement for $\beta$-rays. The measuring arrangement for X-rays allows of providing the optimum geometrical arrangement of the measuring elements for $\beta$-rays and an unobjectionable calibration of this measuring arrangement.

After calibration has been carried out the arrangement for X-rays is removed so that the measuring arrangement with $\beta$-rays is then employed alone for the determination of the titre of bands of fibrous material, rovings and fabrics.

The measuring device slides over a number of threads running parallel to each other and is controlled by a feeler in such a manner that, when a thread passes, the movement of the measuring device is interrupted and this thread automatically introduced into the measuring slit in order to be measured.

According to the invention, an arrangement for measuring the titre consists of a source of rays with a measuring slit, parallel to which the thread is passed, a counting tube for the weakened radiation and a second counting tube for the unweakened one, both these tubes being connected to a differential tube in which a voltage is tapped which, after amplification by means of a direct voltage measuring device, operates a recording unit.

Figure 2:
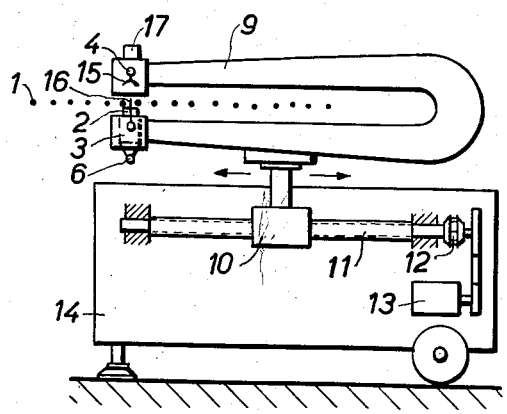

The accompanying drawing shows two embodiments of a measuring device for determining the titre by means of X-rays, in which:

Fig. 1 is a schematic view of an embodiment for determining the titre of a running thread by X-radiation; and Fig. 2 is a schematic view of another embodiment for determining the titre of a running thread by X-radiation.

In the device shown in Fig. 1, a thread 1 runs through a measuring slit 2 which is enlarged towards its upper end like a funnel. The width of the slit is approximately 0.1 mm. The thread 1 is screened in the slit 2 by means of soft X-rays from a tube 3. The intensity of the throughgoing rays which depends on the mass, i.e. on the titre, is measured in a counting tube 4, and the result is read off at the ammeter of a counting tube unit 5. In order to eliminate the effect of the mains fluctuations, a second window of the tube 3 is provided with a compensation counting tube 6. In this manner, only the difference between the weakened and the unweakened radiation is measured.

A voltage is tapped in the differential counting tube unit 5 which voltage, after amplification by a direct voltage measuring amplifier 7, operates a recording unit 8, the paper advance of which can be varied. The connection is so selected, that the zero point at the recording unit 8 can be suppressed. Thus, it is possible for use to be made of the full width of the diagram tape.

The device shown in Fig. 2 is a measuring arrangement for carrying out measurements at a number of threads. This measuring arrangement consists of a U-shaped measuring arm 9, which is attached to a nut 10 that can be moved on the screw 11 to and fro. The screw 11 is driven by means of the motor 13 over a magneto coupling 12. The screw and the drive are placed in a mobile box 14. The apparatus (not shown) required for the operation of an X-ray tube are likewise installed in the box 14. The measuring arm embraces the group of threads 1 to be measured (see also Fig. 1) and can be moved transversely to the running direction of the threads. At the end of the leg 8 of the measuring arm 9, which is arranged beneath the group of threads 1, there is positioned an X-ray tube 3, a compensation counting tube 6 and a measuring slit 2 (see Fig. 1) and a feeler 16 which consists for instance of a platinum wire. At the end of the leg of the measuring arm 9 above the group of threads 1, there is arranged accurately above the measuring slit 2 the counting tube 4 and a gripping device 15. The measurement is initiated by a single thread (out of the group of threads 1) touching and pushing aside the feeler 16 until the feeler makes a contact (not shown) that disconnects the magneto coupling 12 and, at the same time, causes the gripping device 15 to guide the thread with the aid of the electromagnet 17 so that the thread passes the measuring slit 2. At the same time, the feeler 16 is moved downwards by means of another electromagnet (not shown) in such a manner that, after the measurement is finished, the feeler is again in the position to touch the next following thread (not shown).

When the above contact is made a timing relay (not shown) is rendered operative in the box 14 so that the time of measuring can be limited at will. When the time of measuring is up the timing relay releases the gripping device 15 magnetically and, simultaneously, the thread just measured; as mentioned above, the feeler 16 rises again and is then ready for new measurement. The magneto coupling is engaged when the timing relays has run out so that the motor 13 is coupled with the screw 11. The screw 11 moves the measuring arm onto the next thread of the group of threads 1 whereafter the measuring starts again.

We claim:

1. A device for measuring the titre of a group of running threads which comprises means defining an elongated measuring slit dimensioned for the passage of a running thread therealong, means defining a source of X-ray radiation positioned adjacent to said slit for passing X-rays through said slit, measuring means for measuring X-ray intensity positioned on the side of said slit opposite said source of X-ray radiation, means for jointly moving said slit, source of X-ray radiation and measuring means transversely across a group of substantially parallel running threads and alternately interrupting motion as said slit passes adjacent each thread, and means for automatically positioning an adjacent thread for passage along said slit, upon interruption of said motion.

2. Device, according to claim 1, in which said source of X-ray radiation and said measuring means are mounted on opposed arms of a U-shaped member with said measuring slit positioned therebetween, and in which said means for jointly moving said slit, source of X-ray radiation, and means for measuring is means for moving said U-shaped member.

3. Device, according to claim 2, in which said means for automatically positioning an adjacent thread includes thread gripping means and electro-magnetic means for moving actuation of said thread gripping means between a retracted position, clear of the threads, and an extended position in contact with a thread positioning the same for passage along said slit.

4. Device, according to claim 3, in which said means for jointly moving said slit source of X-ray radiation and measuring means includes a nut connected to said U-shaped member, a screw spindle threaded through said nut, and motor-means for rotating said screw spindle.

References Cited in the file of this patent
UNITED STATES PATENTS

| | | |
|---|---|---|
| 2,264,725 | Shoupp et al. | Dec. 2, 1941 |
| 2,370,163 | Hare | Feb. 27, 1945 |
| 2,525,292 | Fua et al. | Oct. 10, 1950 |
| 2,640,788 | Rockett | June 2, 1953 |